W. CABLE.
Thill-Couplings.
No. 137,176.
Patented March 25, 1873.
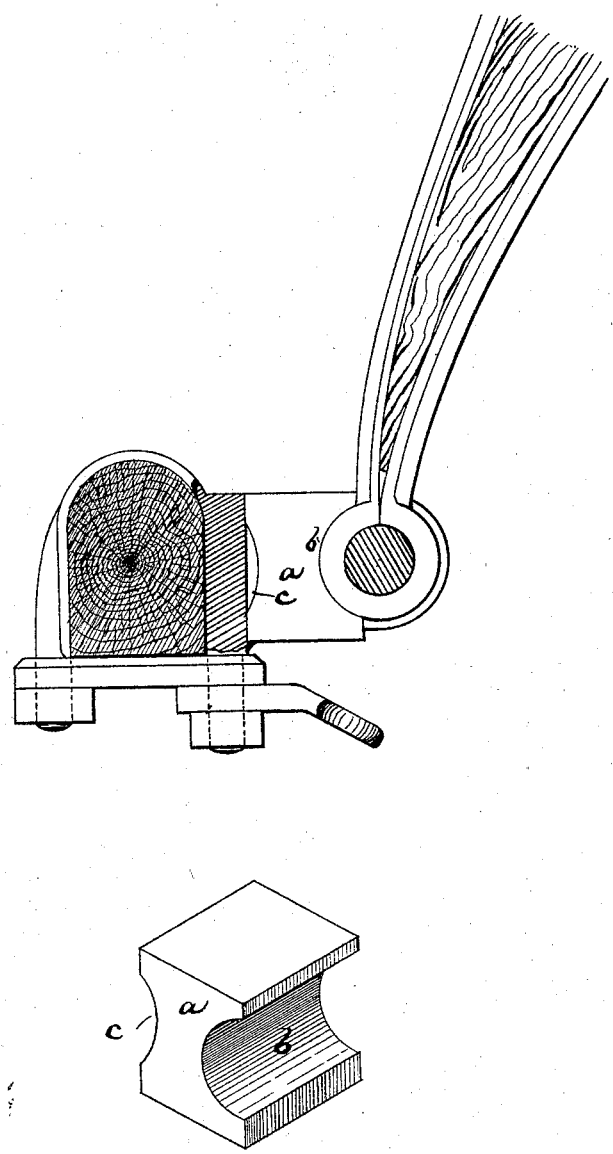
Witnesses.
M. W. Frothingham.
L. H. Latimer.
Inventor.
Wheeler Cable,
By his Attys.
Crosby & Gould.

UNITED STATES PATENT OFFICE.

WHEELER CABLE, OF BOSTON, MASSACHUSETTS.

IMPROVEMENT IN THILL-COUPLINGS.

Specification forming part of Letters Patent No. 137,176, dated March 25, 1873.

*To all whom it may concern:*

Be it known that I, WHEELER CABLE, of Boston, in the county of Suffolk and State of Massachusetts, have invented an Improved Cushion for Carriage Shaft and Axle Connections; and I do hereby declare that the following, taken in connection with the drawing which accompanies and forms part of this specification, is a description of my invention sufficient to enable those skilled in the art to practice it.

To prevent the rattling of carriage shaft and axle connections (in light carriages) it is to some extent customary to use block-rubber springs that keep the shaft and axle from relative forward and back movement. The spring is generally made with a flat side to fit against the axle, and an opposite concave side into which the iron at the end of the shaft-head fits, and the working of the shaft against the rubber soon cuts it through or destroys the spring, the pressure from the bottom of the curve to the straight side having nothing to resist it except upon the line of least resistance.

In my invention I form the spring with concaves on both surfaces, and when the spring is compressed the pressure simply flattens the arch and forces the rubber more tightly against the shaft-iron, the spring being thus rendered far more enduring, and also furnishing a better cushion for the shaft-iron against or with relation to the axle. It is in this construction of the spring that my invention consists.

The drawing represents a spring and the manner of its application.

$a$ denotes the block-spring, the two ends and top and bottom sides of which are all straight or flat. The front side of the spring is formed with the usual deep concave $b$ for receiving or fitting upon the shaft-iron. The rear side is also formed with a concave, $c$, but this concave is shallow or flat as compared to the other. The shaft-iron being coupled to the shaft by the bolt passing through the eye at the end of the iron, and the eyes on the axle-iron, the spring or cushion is crowded in, so that the recess $b$ fits around the curved surface $d$ of the shaft, leaving the other side pressing against the axle $e$. The compression of the rubber tending only to flatten the curve $c$ is resisted by such curve, so that the spring is unimpaired, retaining its shape, elasticity, and strength.

By reason of such construction I am enabled to make the spring without re-enforcing the concave side by a coating of cloth.

I claim—

The rubber cushion or spring, formed with the concave $c$ in addition to the recess $b$, substantially as and for the purpose set forth.

Executed this 30th day of January, A. D. 1873.

WHEELER CABLE.

Witnesses:
 FRANCIS GOULD,
 M. W. FROTHINGHAM.